United States Patent [19]

Tsunoda

[11] Patent Number: 4,865,262
[45] Date of Patent: Sep. 12, 1989

[54] RECIPROCATING MECHANISM FOR SPINNING REEL FOR FISHING

[75] Inventor: Kikuo Tsunoda, Hiroshima, Japan

[73] Assignee: Ryobi Ltd., Hiroshima, Japan

[21] Appl. No.: 281,878

[22] Filed: Dec. 8, 1988

Related U.S. Application Data

[63] Continuation of Ser. No. 76,001, Jul. 21, 1987, abandoned.

[30] Foreign Application Priority Data

Jul. 21, 1986 [JP] Japan ................................. 112480

[51] Int. Cl.$^4$ .............................................. A01K 89/01
[52] U.S. Cl. ............................................................ 242/241
[58] Field of Search .................... 242/84.2 R, 84.2 G, 242/84.21 R, 84.21 A, 84.21 W, 84.4, 158.3

[56] References Cited

U.S. PATENT DOCUMENTS

| | | | |
|---|---|---|---|
| 2,314,616 | 3/1943 | Gaire | 242/84.21 R |
| 4,427,162 | 1/1984 | Noda | 242/84.21 R |
| 4,512,531 | 4/1985 | Tunoda | 242/84.21 R |
| 4,770,363 | 9/1988 | Tsunoda et al. | 242/84.21 R X |

FOREIGN PATENT DOCUMENTS

| | | | |
|---|---|---|---|
| 617477 | 4/1961 | Canada | 242/84.21 R |
| 1176814 | 4/1959 | France | 242/84.21 R |
| 1299923 | 6/1962 | France | 242/84.21 R |

*Primary Examiner*—Joseph J. Hail III
*Attorney, Agent, or Firm*—Finnegan, Henderson, Farabow, Garrett, & Dunner

[57] ABSTRACT

A reciprocating mechanism for a spinning reel for fishing, in which a reciprocating pinion is secured to a tubular pinion shaft through which a main shaft supporting a spool extends and which supports a rotor rotatably to the body of the reel; the reciprocating pinion is located in front of a rotor drive pinion; a reciprocating cam shaft extends through the flange of the body of the reel so that the reciprocating gear is provided on the front end portion of the reciprocating cam shaft is rotatably supported; a reciprocating cam shaft, which extends forward from the flange; and the reciprocating gear is engaged with the reciprocating pinion.

2 Claims, 2 Drawing Sheets

RECIPROCATING MECHANISM FOR SPINNING REEL FOR FISHING

This application is a continuation, Ser. No. 076,001, filed July 21, 1987 now abandoned.

BACKGROUND OF THE INVENTION

The present invention relates to fishings reels and, in particular, to a reciprocating mechanism for a spinning reel for fishing.

FIG. 3 shows a conventional reciprocating mechanism disclosed in the Japanese Utility Model Application (OPI) No. 26864/83 (the term "OPI" as used herein means an "unexamined published application"). Referring to FIG. 3, since the reciprocating cam gear is engaged with the rotor drive pinion 08 engaged with the master gear 04 in the reciprocating mechanism, it is difficult to increase or decrease the reciprocation speed of the spool 010 without altering the driving pinion ratio of the rotor. Since the reciprocating mechanism for the spool 010 needs to be located behind a reciprocating cam shaft, it is necessary to make the body 01 of the spinning reel large, the spinning reel cannot be made compact. Thus, such a conventional reciprocating mechanism has a disadvantge.

SUMMARY OF THE INVENTION

The present invention was made in order to overcome the above-mentioned disadvantage, and in accordance therewith there is provided a reciprocating mechanism for a spinning reel for fishing having a reel body comprising: a rotatable tubular pinion shaft having a front end portion and a rear end portion; a main shaft having front and rear end portion and slidably inserted into the pinion shaft; a rotor drive pinion secured to the rear end portion of the pinion shaft; a rotatable handle shaft operatively connected to the rotor drive pinion to rotate the pinion shaft; a reciprocating pinion fixedly mounted on the pinion shaft in front of the rotor drive pinion; a reciprocating cam shaft having a front end portion rotatably supported in the body; a reciprocating gear fixedly mounted on the front end portion of the reciprocating cam shaft and engaging the reciprocating pinion; and a reciprocator secured to the rear end portion of the main shaft and operatively connected to the reciprocating cam shaft and axially movable with respect thereto.

Thus, the present invention to provides a reciprocating mechanism in which a reciprocating pinion is secured to a rotor drive pinion shaft in front of a rotor drive pinion with regard to the body of a spinning reel, and a reciprocating gear on a reciprocating cam shaft is engaged with the reciprocating pinion, so that the reciprocation speed of a spool can be optionally changed without altering the gear ratio of a rotor and the spinning reel can be made compact.

In the reciprocating mechanism, the reciprocating pinion is secured to a tubular pinion shaft through which a main shaft supporting the spool extends and which supports the rotor rotatably to the body of the spinning reel. The reciprocating pinion is located in front of the rotor drive pinion engaged with a master gear. The reciprocating cam shaft extends through the flange of the body of the reel so that the reciprocating cam shaft is rotatably supported. The reciprocating gear is provided on the front end portion of the reciprocating cam shaft, which extends forward from the flange of the reel body. The reciprocating gear is engaged with the reciprocating pinion. This results in eliminating the above-mentioned drawbacks.

Since the reciprocating pinion is provided on the tubular pinion shaft separately from the rotor drive pinion so as to rotate the reciprocating cam shaft, the reciprocating pinion and the reciprocating gear can be set at an appropriate gear ratio to make it possible to optionally change the reciprocation speed of the spool without altering the drive gear ratio of the rotor.

Since the reciprocating pinion is provided on the tubular pinion shaft in front of the rotor drive pinion and the reciprocating gear is provided on the front end portion of the reciprocating cam shaft extending forward from the flange of the body of the spinning reel and is engaged with the reciprocating pinion, a reciprocator can be located in the front portion of the body of the reel to make it possible to reduce the length of the body of the reel to render the spinning reel compact.

DESCRIPTION OF THE DRAWINGS

The present invention will be better understood by reference to the accompanying drawings, wherein.

DETAILED DESCRIPTION OF EXEMPLARY EMBODIMENT

An embodiment of the present invention is hereinafter described in detail with reference to the drawings attached hereto.

Figure 1:
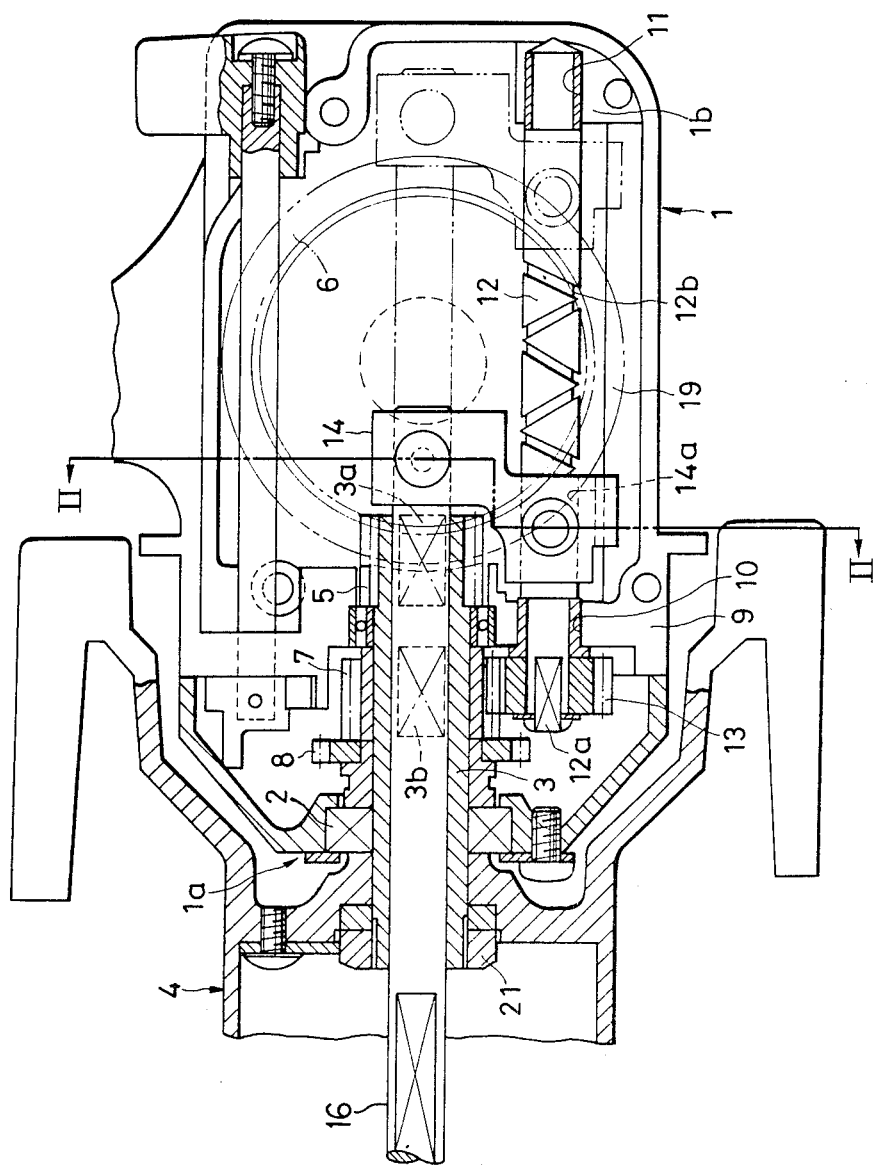
FIG. 1 shows a partially-cutaway longitudinal sectional view of a reciprocating mechanism for a spinning reel for fishing in accordance with the present invention.
Figure 2:
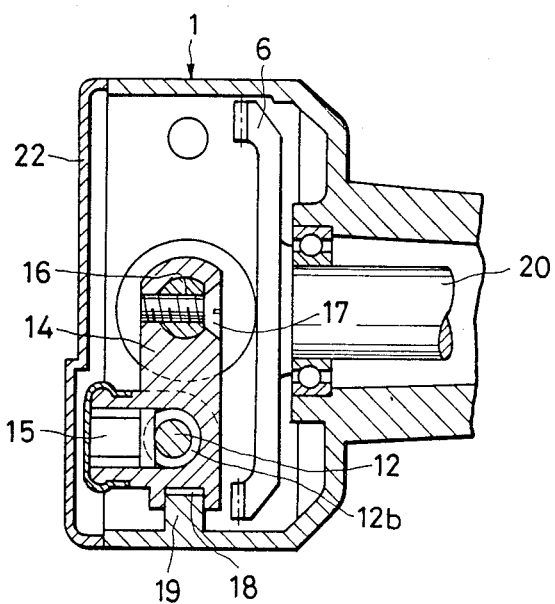
FIG. 2 shows a cross-sectional view along a line II—II shown in FIG. 1.
Figure 3:
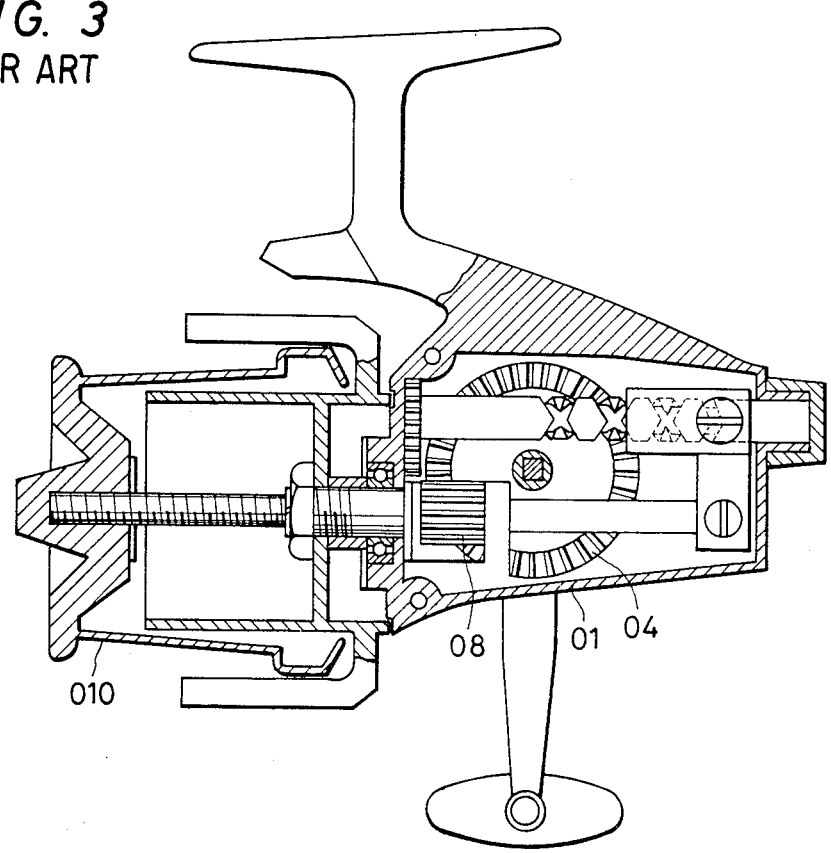
FIG. 3 shows a longitudinally sectional view of a conventional reciprocating mechanism for a spinning reel for fishing.

As shown in FIGS. 1 and 2, a tubular pinion shaft 3 is rotatably supported by a bearing 2 in the supporting portion 1a of the front wall of the body 1 of a spinning reel so that the tubular pinion shaft is fixed, or kept from moving, in the axial direction thereof. A rotor 4 is secured by a nut 21 to the front end portion of the pinion shaft 3, which extends forward from the front wall of the reel body 1. A rotor drive pinion 5 is secured to the rear end of the pinion shaft and engaged with a master gear 6 rotatably supported in the reel body 1 by a handle shaft 20. As a result, the rotor 4 can be rotated by a handle (not shown) on the handle shaft 20.

A ratchet 8 is fixed on the pinion shaft 3, in front of the rotor drive pinion 5, so that the ratchet does not rotate on the pinion shaft.

The portions 3a and 3b of the tubular pinion shaft 3, which correspond to the rotor drive pinion 5 and the reciprocating pinion 7, are provided as notched circular portions. The cross section of each of the pinions 5 and 7 is shaped as an ellipse, a polygon or the like so that the pinions are fitted on the notched circular portions 3a and 3b of the pinion shaft 3.

A reciprocating cam shaft 12 extends in the reel body 1 in parallel with the pinion shaft 3 and is rotatably fitted in shaft holes 10 and 11 provided in a flange 9 on the front of the reel body and the rear wall 1b of the reel body. The front end portion 12a of the reciprocating cam shaft 12 extends from the shaft hole 10 of the flange 9 toward the supporting portion 1a of the reel body 1 and is shaped as a notched circle or the like so that a reciprocating gear 13 is fitted on the front end portion 12a. The reciprocating gear 13 is fitted on the front end portion 12a. The reciprocating gear 13 is engaged with the reciprocating pinion 7.

A reciprocator 14 is provided around the reciprocating cam shaft 12 so that the reciprocator can be slid in the axial direction thereof. A claw 15 extending into the shaft hole 14a of the reciprocator 14 perpendicular to the hole is slidably fitted in the circumferential reciprocating cam groove of the reciprocating cam shaft 12. The reciprocator 14 is secured by a screw 17 to the rear end portion of a main shaft 16 slidably inserted in the tubular pinion shaft 3.

A guide projection 19 provided on the inside surface of the reel body 1 and extending in the front-to-rear direction of the reel body is fitted in a guide groove 18 provided in the bottom of the reciprocator 14 and extending in the front-to-rear direction of the reciprocator, so that the reciprocator can be slid on the guide projection.

The turning force of the handle (not shown in the drawings) is transmitted through the handle shaft 20 to the pinion shaft 3 through the master gear 6 to run the rotor 4 to rotate the reciprocating gear 13 by the reciprocating pinion 7. As a result, the claw 15 is slid in the reciprocating cam groove 12b of the reciprocating cam shaft 12 to move the reciprocator 14 back and forth to reciprocate the main shaft 16 backward and forward together with a spool secured to the main shaft (not shown in the drawings).

Shown at 22 in FIG. 2 is the cover of the reel body 1.

Having described a preferred embodiment of the present invention, it is understood that variations and modifications thereof falling within the scope of the appended claims may become apparent to one skilled in the art.

What is claimed is:

1. A reciprocating mechanism for a spinning reel for fishing having a reel body provided with an inwardly extending radial flange comprising:
   (a) a rotatable tubular pinion shaft in contact with and rotatably supported by said flange having a front end portion and a rear end portion;
   (b) a main shaft having front and rear end portions and being slidably inserted into said pinion shaft;
   (c) a rotor drive pinion secured to said rear end portion of said pinion shaft and disposed behind said flange;
   (d) a master gear rotatably supported in said reel body and engaged with said rotor drive pinion, the rotational axis of said master gear intersecting the rotational axis of said pinion shaft;
   (e) a rotatable handle shaft connected to said master gear for rotating said master gear and said pinion shaft;
   (f) a reciprocating pinion fixedly mounted on said pinion shaft in front of said rotor drive pinion and disposed in front of said flange;
   (g) a reciprocating cam shaft having a front end portion rotatably supported in said body;
   (h) a reciprocating gear fixedly mounted on said front end portion of said reciprocating cam shaft and engaging said reciprocating pinion; and
   (i) a reciprocator secured to said rear end portion of said main shaft and operatively connected to said reciprocating cam shaft and axially reciprocating with respect thereto.

2. A reciprocating mechanism for a spinning reel for fishing having a reel body and a spool secured to a main shaft, which mechanism comprises:
   (a) a tubular pinion shaft having front and rear end portions, rotatably supported on said body provided with an inwardly extending radial flange and axially fixed with respect thereto, said pinion shaft being in contact with and rotatably supported by said flange;
   (b) a rotor secured to said front end portion of said pinion shaft and rotable with respect to said body;
   (c) a rotor drive pinion secured to said rear end portion of said pinion shaft and disposed behind said flange;
   (d) a master gear rotatably supported in said reel body and engaged with said rotor drive pinion, the rotational axis of said master gear intersecting the rotational axis of said pinion shaft;
   (e) a rotatable handle shaft connected to said master gear for rotating said master gear and said pinion shaft;
   (f) a reciprocating pinion fixedly mounted on said pinion shaft in front of said rotor drive pinion and disposed in front of said flange;
   (g) a reciprocating cam shaft, having a front end portion, rotatably supported in said body and parallel to said pinion shaft;
   (h) a reciprocating gear fixedly mounted on said front end portion of said reciprocating cam shaft and engaging said reciprocating pinion;
   (i) a main shaft slidably inserted into said tubular pinion shaft, said main shaft having a front end portion for attachment to said spool and a rear end portion; and
   (j) a reciprocator operatively connected to said reciprocating cam shaft and axially reciprocal with respect thereto, said reciprocator being secured to said rear end portion of said main shaft;

whereby the rotation of said handle shaft causes said rotor to turn and said main shaft to reciprocate.

* * * * *